(12) United States Patent
Hashimoto et al.

(10) Patent No.: US 6,529,179 B1
(45) Date of Patent: Mar. 4, 2003

(54) FLAT PANEL DISPLAY UNIT

(75) Inventors: Takeshi Hashimoto, Himeji (JP); Satoru Yamanaka, Fukaya (JP); Tetsuya Murai, Fukaya (JP); Tomio Makino, Oku-gun (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/363,106

(22) Filed: Jul. 30, 1999

(30) Foreign Application Priority Data

Jul. 31, 1998 (JP) .......................................... 10-217750

(51) Int. Cl.⁷ ................................................ G09G 3/36
(52) U.S. Cl. .......................... 345/87; 345/102; 345/104; 345/84; 349/12; 349/61; 349/149
(58) Field of Search ............................ 345/55, 87, 102, 345/901, 905, 84, 104; 349/12, 61, 62, 65, 149, 151, 152

(56) References Cited

U.S. PATENT DOCUMENTS

| | | | | |
|---|---|---|---|---|
| 5,150,231 A | * | 9/1992 | Iwamoto et al. | 359/44 |
| 5,484,647 A | * | 1/1996 | Nakatani et al. | 428/209 |
| 5,640,216 A | * | 6/1997 | Hasegawa et al. | 349/58 |
| 5,731,796 A | * | 3/1998 | Furuhashi et al. | 345/96 |
| 5,739,887 A | * | 4/1998 | Ueda et al. | 349/149 |

FOREIGN PATENT DOCUMENTS

| | | | | |
|---|---|---|---|---|
| GB | 2247113 A | * | 2/1992 | H05K/3/32 |
| JP | 04206689 A | * | 7/1992 | H05K/3/46 |
| JP | 6-273789 | | 9/1994 | |
| JP | 08273417 A | * | 10/1996 | F21V/8/00 |
| JP | 9-146113 | | 6/1997 | |
| JP | 11-038431 | | 2/1999 | |
| JP | 11-109398 | | 4/1999 | |
| JP | 11-149251 | | 6/1999 | |

* cited by examiner

Primary Examiner—Bipin Shalwala
Assistant Examiner—Jimmy H. Nguyen
(74) Attorney, Agent, or Firm—Pillsbury Winthrop LLP

(57) ABSTRACT

In this flat panel display unit, a tubular light source is disposed on a thick end face of a light guide plate and a driving circuit substrate is disposed along an end perpendicular to the end face of the light guide plate, thereby achieving thinning or downsizing of the unit.

3 Claims, 4 Drawing Sheets

FLAT PANEL DISPLAY UNIT

BACKGROUND OF THE INVENTION

The present invention relates to a flat panel display unit and more particularly to a structure of a flat panel display unit in which thinning or downsizing thereof is achieved.

The flat panel display unit represented by a liquid crystal display has been widely used in various fields exerting its features such as lightweight, thin structure and low power consumption. Particularly the liquid crystal display is often used in portable information apparatuses such as a personal computer.

Recently, such a liquid crystal display has been demanded to be further thinned or downsized.

To meet the above demand, according to a trial, a driving circuit is formed integrally with a substrate forming the liquid crystal display, thereby reducing an external circuit, so as to achieve the further thinning or downsizing of the structure of the flat panel display unit.

However, in this structure, the external circuit has not been constructed totally integrally therewith and therefore, currently, there is no way but still providing some external circuit.

BRIEF SUMMARY OF THE INVENTION

Accordingly, the present invention has been achieved to solve the above problem, and therefore, an object of the invention is to provide a flat panel display unit in which a further thinning or downsizing thereof is achieved.

To achieve the above object, according to the present invention, there is provided a flat panel display unit comprising: a display panel provided with an electrode substrate including a plurality of horizontal pixel lines each in which a plurality of display pixels are arranged; a driving circuit substrate for supplying a driving signal to the electrode substrate of the display panel; a connecting member for electrically connecting the electrode substrate and the driving circuit substrate; and a surface light source unit including a light guide plate disposed on a rear surface side of the display panel and a tubular light source disposed along an end face at a first edge side of the light guide plate, wherein the electrode substrate of the display panel includes a driving circuit portion for driving display pixels, a second edge side opposing the first edge side of the light guide plate is thinner than the first edge side, and the driving circuit substrate is disposed along a third edge side perpendicular to the first edge side of the light guide plate.

According to the present invention, because the driving circuit substrate is disposed along an end face of the wedge shaped light guide plate, thinning of the unit is not obstructed. Further, because part of the driving circuit is formed on the electrode substrate of the display panel integrally therewith, the circuit substrate area can be reduced and thus, the frame size is never impaired seriously.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, the embodiments of the flat panel display unit according to the present invention will be described with reference to the accompanying drawings.

Figure 1:
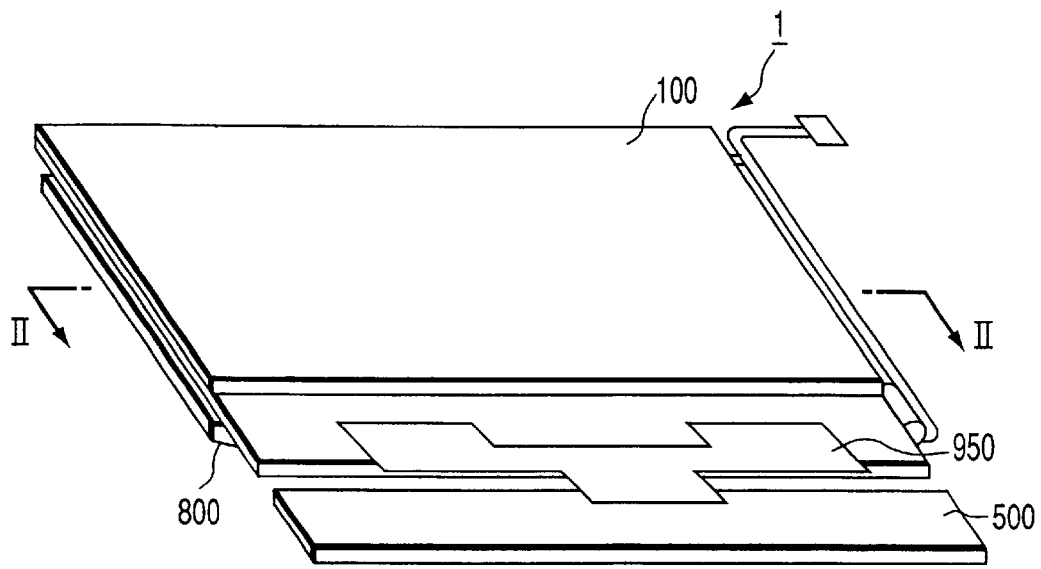
FIG. 1 is a schematic perspective view of a liquid crystal display unit according to an embodiment of a flat panel display unit of the present invention.
Figure 2:
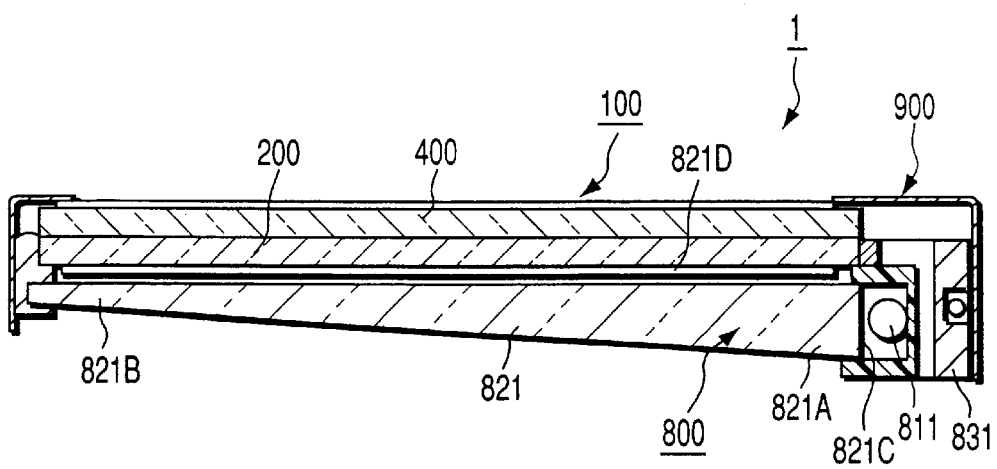
FIG. 2 is a schematic sectional view taken along the line II—II of the liquid crystal display unit shown in FIG. 1.

As shown in FIGS. 1 and 2, the liquid crystal display unit 1 comprises a liquid crystal display panel 100, a driving circuit substrate 500 for supplying a driving signal to the liquid crystal display panel 100, a surface light source unit 800 disposed in the rear surface of the liquid crystal display panel 100 and a bezel 900 for holding the liquid crystal display panel 100 with the surface light source unit 800. The liquid crystal display panel 100 and the driving circuit substrate 500 are connected electrically to each other through a flexible wiring film 950.

Figure 3:
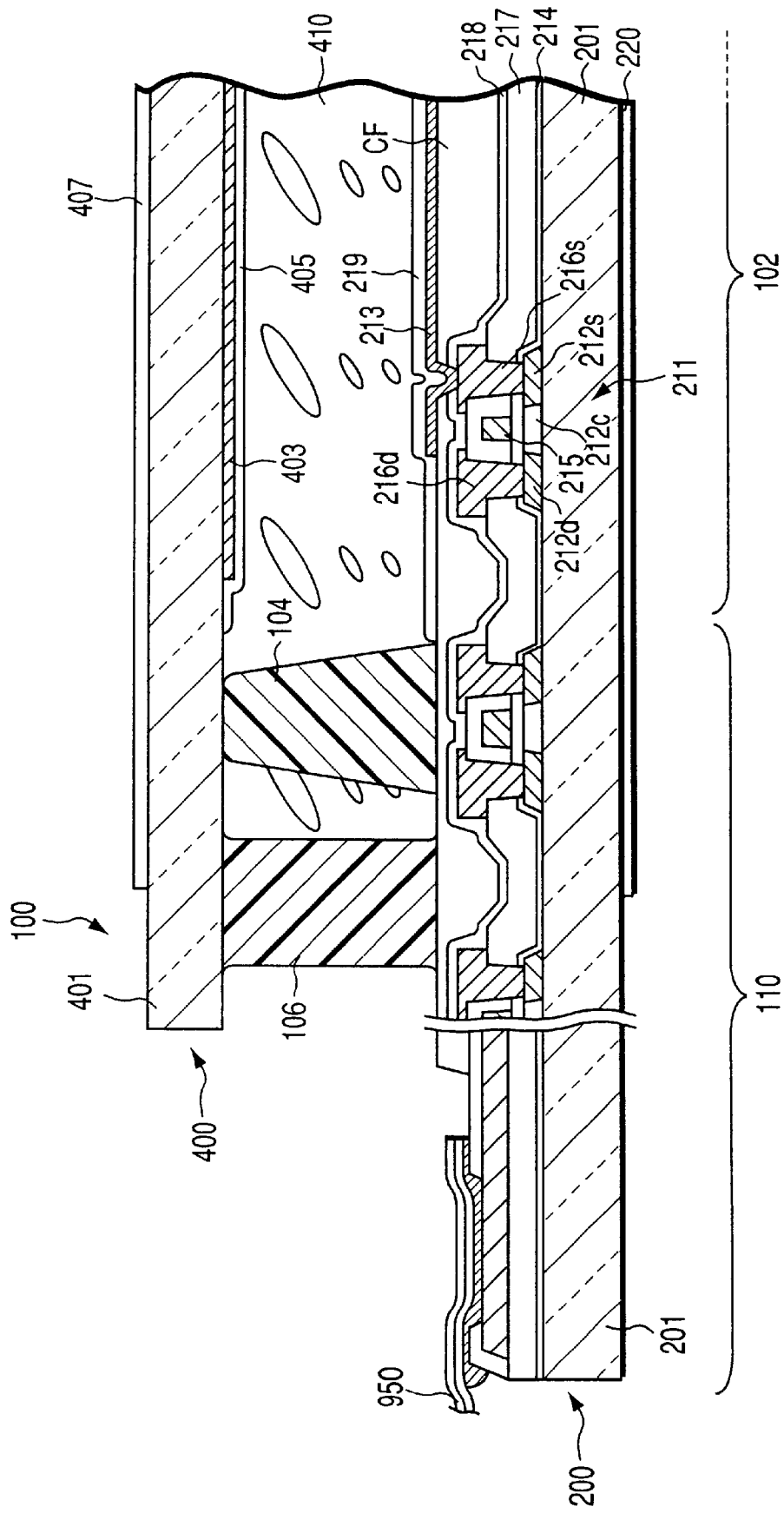
FIG. 3 is a schematic sectional view of a liquid crystal display panel applied to the liquid crystal display unit shown in FIG. 1.
Figure 4:
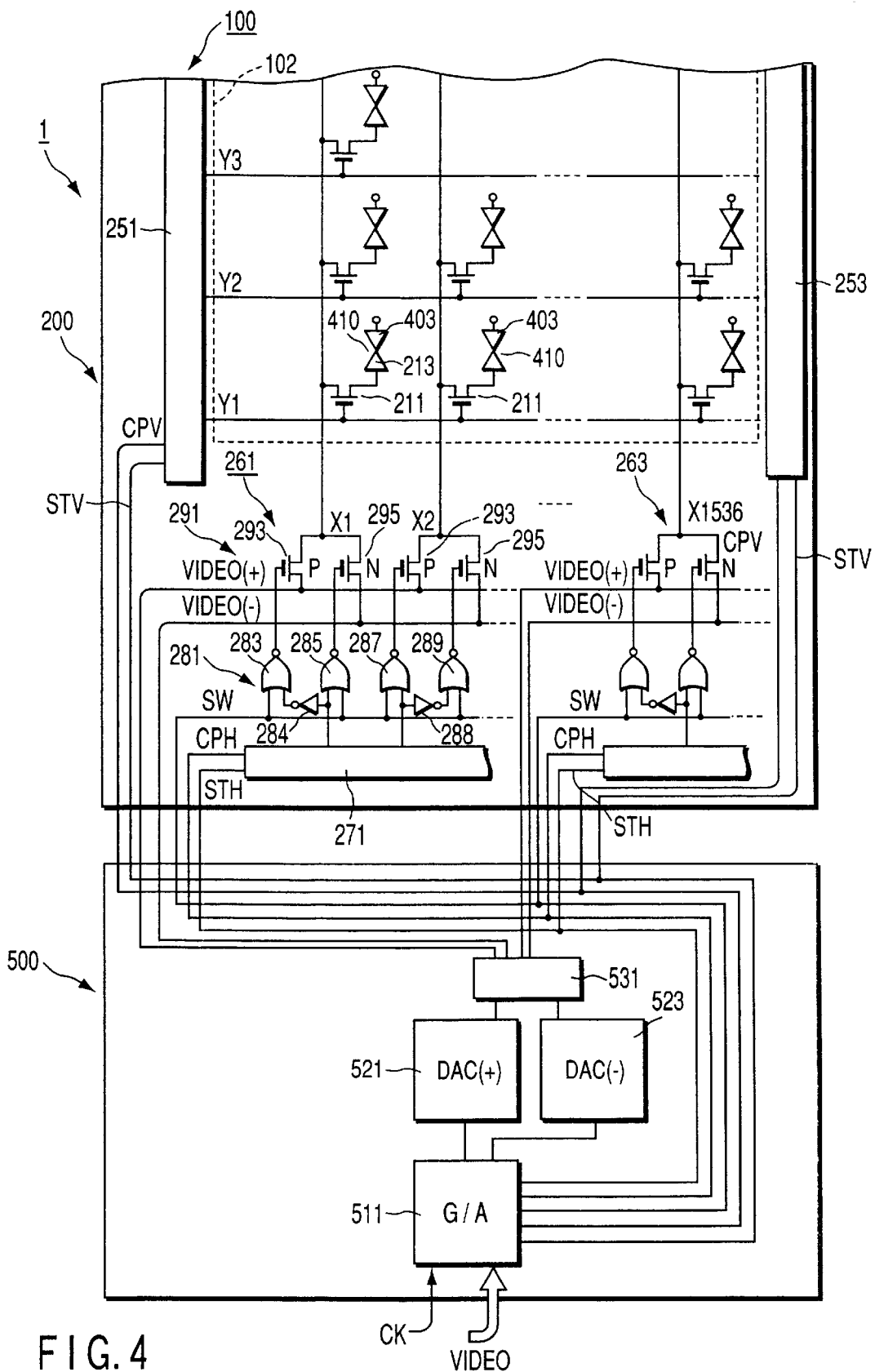
FIG. 4 is a diagram showing an equivalent circuit of the liquid crystal display unit shown in FIG. 1.

In detail, this liquid crystal display panel 100 includes a XGA-specification valid display region 102 having (1024× 3)×800 display pixels having a size of 12.1 inch diagonally as shown in FIGS. 3 and 4. The liquid crystal display panel 100 includes an array substrate 200, an opposing substrate 400 and twisted nematic (TN) liquid crystal layer 410 held between the array substrate 200 and opposing substrate 400 via each orientation film.

To achieve further thinning of the structure, the array substrate 200 has 1024×3 signal lines Xi (i=1, 2, ... 1024×3) and 800 scanning lines Yj (j=1, 2, ... 800)disposed in matrix shape, thin film transistors, that is, switching devices 211 composed of TFT disposed in the vicinity of an intersection between the signal line Xi and scanning line Yj and pixel electrodes 213 connected to the switching devices 211, these components being disposed on a transparent insulation substrate 201 having a thickness of 0.5 mm made of glass.

This switching device 211 comprises polycrystalline silicone film that is p-Si film having a channel region 212c, a source region 212s and a drain region 212d disposed with the channel region 212c sandwiched thereby, a gate electrode 215 disposed on the channel region 212c of the p-Si film via a gate insulation film 214 and electrically connected to the scanning lines Yj, and source electrode 216s and drain electrode 216d connected to the source region 212s and drain region 212d respectively.

This gate electrode 215 is connected to the scanning line Yj, the drain electrode 216d is connected to the signal line Xj and the source electrode 216s is connected to the pixel electrode 213.

This pixel electrode 213 is formed of transparent conductive member, for example, ITO and disposed on interlayer insulation film 217, passivation film 218 and color filter layer CF laminated successively on the TFT 211. The interlayer insulation film 217 and passivation film 218 are formed of silicone nitride. The pixel electrode 213 is covered with the orientation film 219 disposed in the entire valid display region 102.

The opposing electrode 400 comprises an opposing electrode 403 which is disposed on transparent insulation substrate 401 having a thickness of 0.5 mm made of glass and opposes the pixel electrode 213. This opposing electrode 403 is formed of transparent conductive member, for example, ITO and covered with the orientation film 405 disposed in the entire valid display region 102.

A pair of polarization films 220, 407 in which a polarization direction is set up corresponding to the characteristic of the liquid crystal layer 410 are provided on external surfaces of the array substrate 200 and opposing substrate 400.

Within and outside the valid display region 102, resin made spacers 104 are disposed to form a predetermined gap between the array substrate 200 and the opposing substrate 400.

The array substrate 200 and opposing substrate 400 are bonded to each other with sealing agent 106 such that a predetermined gap is formed by the spacers 104.

Around the valid display region 102 is disposed the driving circuit portion 110 formed integrally therewith.

On both ends of the scanning line Yj are disposed scanning line driving circuits 251, 253 for supplying scanning pulses. These scanning line driving circuits 251, 253 each include a shift register for transferring and outputting vertical start pulse STV successively based on the vertical clock signal CPV.

A pair of signal line driving circuit portions 261, 263 is disposed on one end of the signal line Xi. Because the structure of each thereof is substantially the same, a structure of the signal line driving circuit portion 261 will be described here.

The signal line driving circuit portion 261 includes a shift register 271 for transferring and outputting horizontal start pulse STH successively based on horizontal clock signal CPH. An output of this shift register 271 is introduced to a logical circuit portion 281. Further, an analog sampling portion 291 samples predetermined analog video signals Video (+), Video (−) based on an output of the logical circuit portion 281 respectively and outputs the analog video signals to a corresponding signal line Xi.

The logical circuit portion 281 includes a pair of OR gates 283, 285, NAND gate 287 and NOR gate 289.

The OR gate 283 is connected to a selective wiring supplied with a selection signal SW and then connected to a first output terminal of the shift register 271 through an inverter circuit 284. The OR gate 285 is connected to a selective wiring supplied with a selection signal SW and then connected to a first output terminal of the shift register 271.

The OR gate 283 outputs a signal for controlling a gate of a P type sampling TFT 293 for sampling positive phase analog video signal Video (+) based on the selection signal SW and a signal outputted from the first output terminal. The OR gate 285 outputs a signal for controlling a gate of a N type sampling TFT 295 for sampling negative phase analog video signal Video (−) based on the selection signal SW and a signal outputted from the first output terminal through the inverter circuit 284.

The NAND gate 287 is connected to the selective wiring supplied with the selection signal SW and further connected to the second output terminal of the shift register 271. The NOR gate 289 is connected to the selective wiring supplied with the selection signal SW and further connected to the second output terminal of the shift register 271 through the inverter circuit 288.

The NAND gate 287 outputs a signal for controlling a gate of a P type sampling TFT 293 for sampling positive phase analog video signal Video (+) based on the selection signal SW and an output signal from the second output terminal. The NOR gate 289 outputs a signal for controlling a gate of a N type sampling TFT 295 for sampling negative phase analog video signal Video (−) based on the selection signal SW and an output signal from the second output terminal through the inverter circuit 288.

With the above structure, the analog video signal Video supplied from outside can be distributed on the substrate while separated to positive phase and negative phase. Therefore, power consumption can be reduced and deterioration of waveform of the analog video signal Video does not occur. The reason why in this embodiment, a pair of the signal line driving circuit portions 261, 263 are disposed so as to divide the signal line Xi to two sections is to reduce the length of wire for transmitting the analog video signal Video on the substrate and further set up each processing time substantially longer by operating the two at the same time. Although the signal line is divided to two sections here, it is permissible to divide it to three or more sections.

With the above structure, not only the analog video signal Video is distributed on the substrate while divided to positive phase and negative phase, but also positive and negative polarities can be inverted every signal line Xi adjacent to each other, thereby making it possible to reduce flicker.

From outside, digital video signal Video and system clock signal CK are inputted to the driving circuit substrate 500 for driving this liquid crystal display panel 100. The control circuit G/A511 distributes the digital video signal Video to positive and negative digital/analog conversion circuits 521, 523 based on the system clock signal CK.

The positive digital/analog conversion circuit 521 converts distributed digital video signal Video to positive phase analog video signal Video (+) in a range of 5–10V. The negative digital/analog conversion circuit 523 converts the distributed digital video signal Video to negative phase analog video signal Video (−) in a range of 0–5V. Then, a distribution circuit 531 introduces outputs of the positive side digital/analog conversion circuit 521 and negative side digital/analog conversion circuit 523 to positive and negative phase transmission lines.

In this embodiment, to achieve thinning of the structure, a substrate 551 having interstitial via hole (IVH) structure is used as a driving circuit substrate 500. The control circuit G/A 511 and the digital/analog conversion circuits 521, 523 utilize chip size package (CSP) structure.

Figure 5:
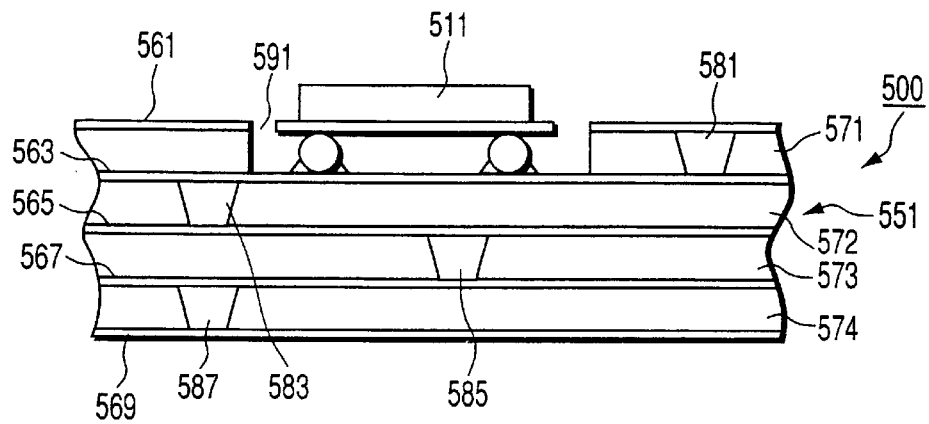
FIG. 5 is a schematic sectional view of a circuit substrate applied to the liquid crystal display unit shown in FIG. 1.

In the substrate 551 having the IVH structure, as shown in FIG. 5, plural copper foils 561, 563, 565, 567, 569 are laminated via insulation materials 571, 572, 573, 574. The respective copper foils 561, 563, 565, 567, 569 are electrically connected via silver paste columns 581, 583, 585, 587, not via the conventional contact holes. Therefore, mounting density can be intensified.

In the CSP structure, as shown in FIG. 5, a substrate in which a semiconductor chip is mounted with face up or face down is connected via a bump formed with soldering ball or the like, so that the size thereof can be sufficiently reduced and narrow pitch connection can be achieved.

Further, according to this embodiment, to achieve a further smaller size and thinner structure, as shown in FIG. 5, the control circuit G/A 511 formed in the CSP structure is embedded in a groove 591 formed in the substrate 551 and electrically connected to the copper foil 563 inside.

According to this embodiment, as shown in FIGS. 1, 2, a tubular light source 811 of the surface light source unit 800 is disposed on an end face in the short side direction of the aforementioned liquid crystal display panel 100, that is, along an end face of the scanning line driving circuit 253.

A light guide plate 821 of the surface light source unit 800 held by a frame 831 is disposed on a rear surface side of the liquid crystal display panel 100. This light guide plate 821 is formed of acrylic resin of a wedge shape having a thick portion 821A (including a first edge side) of about 2.0 mm in thickness and a thin portion 821B (including a second edge side opposing the first edge side) of about 0.8 mm in thickness. The tubular light source 811 is disposed on an end face of the thick portion 821A of the light guide plate 821.

The driving circuit substrate 500 is disposed in the vicinity of the signal line driving circuits 261 in the longitudinal direction of the liquid crystal display panel 100. That is, the driving circuit substrate 500 is disposed along an end face (a third edge side) perpendicular to an end face 821C (in which the tubular light source is disposed) of the light guide plate 821 as shown in FIGS. 1 and 2. In this embodiment, the driving circuit substrate 500 is disposed along an outer periphery of end faces of the signal line driving circuits 261 of the liquid crystal display panel 100.

Light emitted from the tubular light source 811 impinges upon an incident end face 821C of the thick portion 821A of the light guide plate 821 and is propagated inside the light guide plate 821. A reflection sheet (not shown) is disposed on the rear surface of the light guide plate 821 so as to reflect light leaking to the rear side from the light guide plate 821 toward the light guide plate 821. Light propagated entirely in the light guide plate 821 is emitted from an emission surface 821D opposing the liquid crystal display panel 100. Light emitted from the emission face 821D is provided with a predetermined optical characteristic by an optical sheet interposed between the light guide plate 821 and liquid crystal display panel 100, for example, a diffusion sheet or prism sheet for collimating light and impinges upon the array substrate 200 of the liquid crystal display panel 100.

Light entering into the liquid crystal display panel 200 is modulated by a liquid crystal layer 410 controlled by electric field between the pixel electrode 213 and opposing electrode 403 and selectively transmitted through display pixel so as to form a display image.

As described above, in the liquid crystal display unit 1 of this embodiment, a part of the driving circuit is formed on the array substrate 200 integrally therewith. Therefore, the size of the external circuit size can be reduced as compared to the conventional circuit. Further, because the IVH structure substrate 511 and CSP structure are effectively combined, reduction of the size and thinning of the circuit substrate 500 are carried out.

Further, according to this embodiment, the driving circuit substrate 500 in which reduction of the size and thinning of the structure are achieved is disposed in the longitudinal direction of the liquid crystal display panel 100, that is, along the signal line driving circuits 261. Therefore, the entire thickness of the unit can be reduced sufficiently.

Further, the driving circuit substrate 500 is disposed in the longitudinal direction of the light guide plate 821 so as to run along the wedge shape of the light guide plate 821. Relatively thick parts of the driving circuit substrate 500 are disposed on the side of the thick portion 821A of the light guide plate 821 and relatively thin parts of the driving circuit substrate 500 are disposed on the side of the thin portion 821B of the light guide plate 821. Because the thickness of the driving circuit substrate 500 is smaller than a sum of the thickness of the liquid crystal display panel 100 and thickness of the light guide plate 821 at each position in which they oppose each other, the entire thickness of the unit is never increased by disposing the driving circuit substrate 500.

Further, because according to this embodiment, the driving circuit substrate 500 is disposed in the longitudinal direction of the liquid crystal display panel 100, that is, along the signal line driving circuit 261, the distance of wire with a flexible wiring film 950 can be reduced. Therefore, an influence of unnecessary radiation can be reduced considerably.

Figure 6:
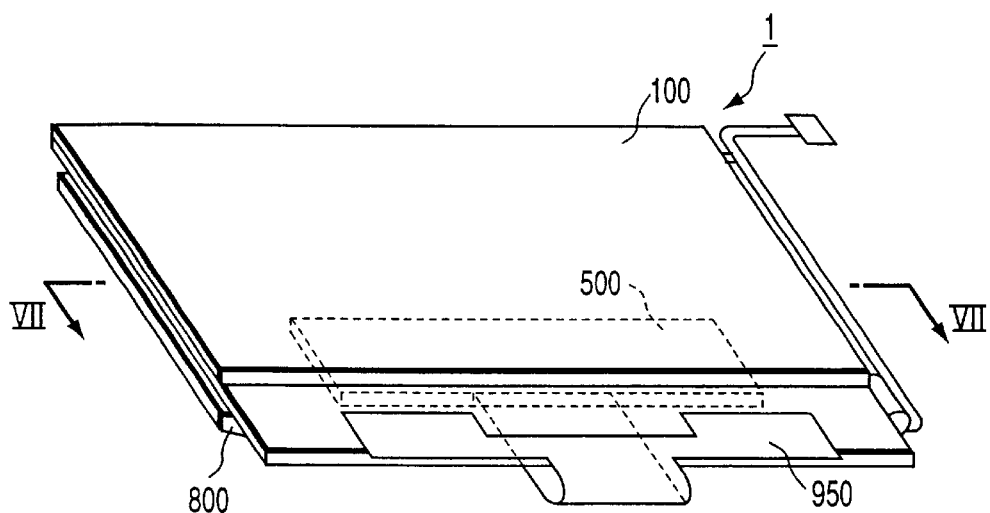
FIG. 6 is a schematic perspective view of the liquid crystal display unit according to the other embodiment of the flat panel display unit of the present invention.
Figure 7:
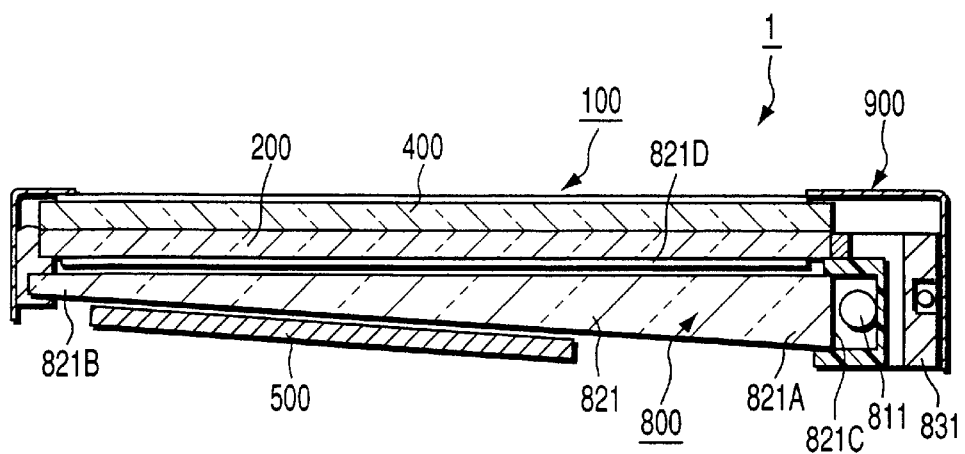
FIG. 7 is a schematic sectional view taken along the line VII—VII of the liquid crystal display unit shown in FIG. 6.

Although, according to this embodiment, the driving circuit substrate 500 is disposed along the outer periphery of the signal line driving circuit 261 of the liquid crystal display panel 100, it is permissible to dispose the driving circuit substrate 500 over the thin portion 821B of the wedge-shaped light guide plate 821. That is, as shown in FIGS. 6 and 7, the thickness of the driving circuit substrate 500 is smaller than a difference between the thickness of the thin portion 821A of the light guide plate 821 and the thin portion 821B. Therefore, by disposing the driving circuit substrate 500 below the thin portion 821B in the longitudinal direction of the light guide plate 821, the liquid crystal display unit 1 can be formed very thin and the frame width can be reduced.

Although the above embodiments have been described about a liquid crystal display unit, the present invention can be applied to other display panels.

As described above, according to the present invention, a very thin and compact display unit can be provided even if complete integration of a driving circuit is not achieved on a substrate constituting a display unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A flat panel display unit comprising:
   a display panel having an electrode substrate including a plurality of horizontal pixel lines, each of the horizontal pixel lines including a plurality of display pixles, a signal line driving circuit portion disposed along the horizontal pixel lines, and a scanning line driving circuit portion disposed perpendicularly to the horizontal pixel lines;
   a surface light source unit including a light guide plate disposed on a rear surface side of the display panel and a tubular light source disposed along an end face at a first edge side of the light guide plate, a second edge side of the light guide plate opposing the first edge side, the first edge side having a first thickness and the second edge side having a second thickness thinner than the first thickness of the first edge side; and a driving circuit substrate disposed along a third edge side of the light guide plate perpendicular to the first edge side, wherein at least one of the scanning line driving circuit portion and the signal line driving circuit portion in the electrode substrate is disposed along the third edge side of the light guide plate, a connecting member connects the electrode substrate and the driving circuit substrate for supplying driving signals to the signal line driving circuit portion and the scanning line driving circuit portion, and thick parts of the driving circuit substrate are disposed along the first thickness of the first side of the light guide plate and thin parts of the driver circuit substrate are disposed along the second thickness of the second side of the light guide plate.

2. A flat panel display unit according to claim 1, wherein the thickness of the driving circuit substrate is smaller than a sum of the thickness of the display panel and the thickness of the third edge side of the light guide plate at each place in the vicinity of the third edge side.

3. A flat panel display unit according to claim 1, wherein the driving circuit substrate has interstitial via hole structure.

* * * * *